(12) United States Patent
Groppe et al.

(10) Patent No.: US 9,752,322 B2
(45) Date of Patent: Sep. 5, 2017

(54) TUBULAR SUPPORT BEAM WITH SELF-DRAINING SURFACE

(71) Applicants: Rudi Groppe, Gilroy, CA (US); William Roby, Gilroy, CA (US); Erick Arthur Davidson, Salinas, CA (US)

(72) Inventors: Rudi Groppe, Gilroy, CA (US); William Roby, Gilroy, CA (US); Erick Arthur Davidson, Salinas, CA (US)

(73) Assignee: Heinzen LLC, Gilroy, CA (US)

( * ) Notice: Subject to any disclaimer, the term of this patent is extended or adjusted under 35 U.S.C. 154(b) by 154 days.

(21) Appl. No.: 14/832,872

(22) Filed: Aug. 21, 2015

(65) Prior Publication Data

US 2017/0051507 A1    Feb. 23, 2017

(51) Int. Cl.
*E04C 3/04* (2006.01)
*B23K 101/04* (2006.01)

(52) U.S. Cl.
CPC ............ *E04C 3/04* (2013.01); *B23K 2201/04* (2013.01); *E04C 2003/0413* (2013.01); *E04C 2003/0465* (2013.01)

(58) Field of Classification Search
CPC ................ E04C 3/04; E04G 1/00; E04G 1/04
USPC ..... 52/843, 845, 716.2, 204.1, 204.2, 204.5, 52/209; 29/897.31, 897.312
See application file for complete search history.

(56) References Cited

U.S. PATENT DOCUMENTS 2,678,488 A * 5/1954 Erzer ........................ E04C 3/06
29/897.35
2,959,256 A * 11/1960 Deam .................... E04B 1/2403
403/174
4,041,270 A * 8/1977 Akahide .............. B23K 33/004
219/137 R
4,241,826 A * 12/1980 Billington .............. B65G 39/12
198/825
4,314,132 A * 2/1982 Porter .................. B23K 33/004
219/137 R
4,970,833 A * 11/1990 Porter ....................... E04B 1/24
403/171

(Continued)

OTHER PUBLICATIONS

Mehta, A. et al., "The Dynamics of Sand", Rep. Prog. Phys (1994) 383-416.

(Continued)

*Primary Examiner* — Joshua J Michener
*Assistant Examiner* — Matthew Gitlin
(74) *Attorney, Agent, or Firm* — GSS Law Group

(57) ABSTRACT

A tubular support beam having a self-draining surface, comprising a first channel having a first channel side wall and a first channel bottom wall, wherein the first channel side wall forms a substantially 90° interior angle with the first channel bottom wall and a second channel having a second channel side wall and a second channel bottom wall, wherein the second channel side wall forms a substantially 90° interior angle with the second channel bottom wall. Either the first channel and/or the second channel having an angled or convex top wall, wherein the first channel and the second channel are joined to provide a self-draining surface for the tubular support beam. The self-draining tubular support beam may be implemented into hygienically designed food processing equipment to eliminate undesirable horizontal surfaces.

15 Claims, 11 Drawing Sheets

(56) References Cited

U.S. PATENT DOCUMENTS

| | | | | |
|---|---|---|---|---|
| 5,326,187 | A | * | 7/1994 | St. Marie ............ E04F 11/1836 256/66 |
| 5,881,508 | A | * | 3/1999 | Irvine ....................... E01C 5/20 405/219 |
| 7,257,932 | B2 | * | 8/2007 | Ng ............................ E04C 3/07 138/168 |

OTHER PUBLICATIONS

Webster, A.G., "On the Angle of Repose of Wet Sand", Proceedings of the Ntional Academy of Sciences, vol. 5, No. 7, Jul. 1919, pp. 263-265.

Internet web page from address "www.landscapeinfoguide.com.au", author and publication date unknown.

\* cited by examiner

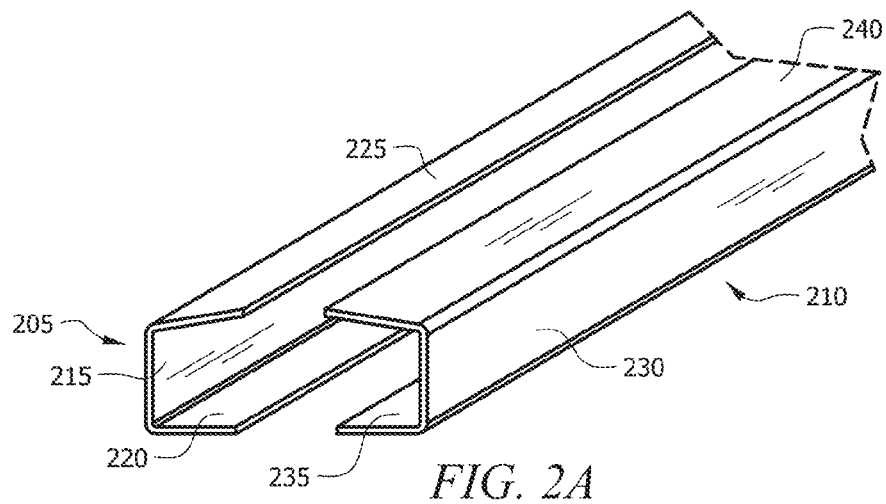
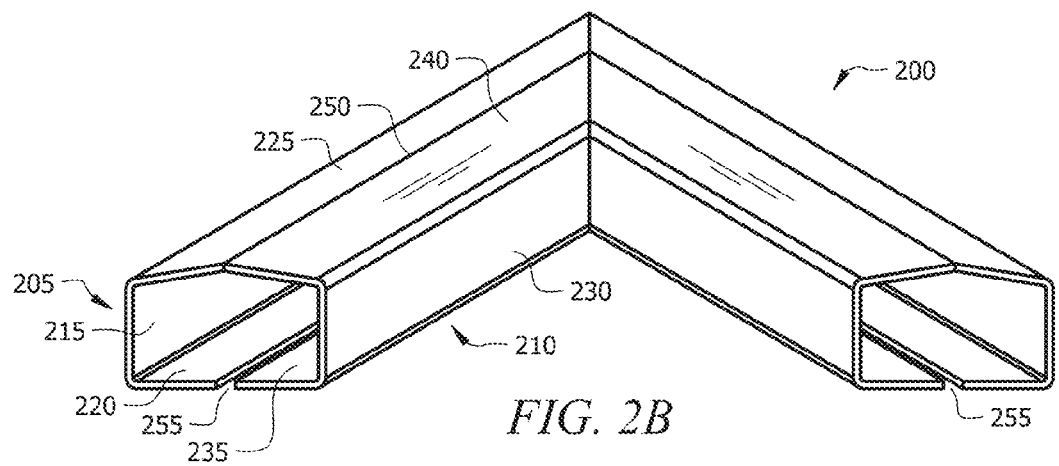

TUBULAR SUPPORT BEAM WITH SELF-DRAINING SURFACE

FIELD OF THE INVENTION

The present invention relates generally to a tubular support beam, and more particularly to a tubular support beam designed for use in food processing equipment that minimizes the possibility of contamination from pooled water on horizontal surfaces of the equipment.

BACKGROUND OF THE INVENTION

The Food Safety Modernization Act (FSMA) of 2011 aims to ensure that the United States food supply is safe by shifting the focus from simply responding to food contamination to proactively preventing the contamination of food. As such, there is a need in the art for hygienically designed food processing equipment that produces microbiologically safe food by minimizing the risk of contamination. It is also desirable that the hygienically designed food processing equipment be easily cleaned and sanitized to further reduce the risk of contamination.

Standing water on horizontal surfaces in a food processing facility, such as food processing platforms and walkways, has been identified as one potential cause of food contamination. The pooled water provides a breeding ground for bacteria, such as *listeria*, which multiplies in wet conditions that lack sanitary measures. In addition, washing and sorting equipment that is not designed to allow for adequate cleaning and sanitizing can provide an additional breading ground for bacteria.

Horizontal structural support beams for walkways and platforms have been identified as one potential location of pooled water. In an effort to reduce the standing water on these support beams, prior art solutions have utilized standard square or rectangular tubular support beams rotated on a center axis to replace the horizontal surface of the support beam with an angled edge that is effective is shedding water from its surface. However, placing a standard tubular support beam at such an angle greatly reduces the load carrying capability of the support beam. Supporting the same load with a beam having a reduced load carrying capability requires an increased number of vertical support beams, having a shorter span distance between vertical supports, to adequately support the same load. The requirement of additional vertical support beams in food processing equipment is undesirable because the additional vertical support beams result in the processing equipment being more difficult to sanitize and increase the overall cost of the equipment.

According, what is needed in the art is an improved structural support beam for use in hygienically designed food processing equipment that eliminates undesirable horizontal surfaces and provides increased load-carrying capability.

SUMMARY

In various embodiments, the invention includes a tubular support beam having a self-draining surface, the tubular support beam comprising, a first channel having at least a first channel side wall and a first channel bottom wall, wherein a first lengthwise edge of the first channel side wall is contiguous with and forms a substantially 90° interior angle with a first lengthwise edge of the first channel bottom wall and a second channel having at least a second channel side wall and a second channel bottom wall, wherein a first lengthwise edge of the second channel side wall is contiguous with and forms a substantially 90° interior angle with a first lengthwise edge of the second channel bottom wall. The tubular support beam further comprising, at least one of the first channel or the second channel comprising a top wall, wherein a first lengthwise edge of the top wall is contiguous with and forms an interior angle greater than 90° with either a second lengthwise edge of the first channel side wall or a second lengthwise edge of the second channel side wall. To join the first channel to the second channel, the tubular support team further comprising, a first weld joint joining the first channel and the second channel at a second lengthwise edge of the top wall of the first channel or the second channel, wherein a second lengthwise edge of the first channel bottom wall is aligned with a second lengthwise edge of the second channel bottom wall and separated by a root gap and a second weld joint formed within the root gap joining the second lengthwise edge of the first channel bottom wall to the second lengthwise edge of the second channel bottom wall to form a tubular support beam having a self-draining surface.

In an additional embodiment, a method of manufacturing a tubular support beam having a self-draining surface includes, forming a first channel having at least a first channel side wall and a first channel bottom wall, wherein a first lengthwise edge of the first channel side wall is contiguous with and forms a substantially 90° interior angle with a first lengthwise edge of the first channel bottom wall and forming a second channel having at least a second channel side wall and a second channel bottom wall, wherein a first lengthwise edge of the second channel side wall is contiguous with and forms a substantially 90° interior angle with a first lengthwise edge of the second channel bottom wall, and wherein at least one of the first channel or the second channel comprising a top wall, wherein a first lengthwise edge of the top wall is contiguous with and forms an interior angle greater than 90° with either a second lengthwise edge of the first channel side wall or a second lengthwise edge of the second channel side wall. The method further includes, forming a first weld joint to join the first channel and the second channel at a second lengthwise edge of the top wall of the first channel or the second channel, wherein a second lengthwise edge of the first channel bottom wall is aligned with a second lengthwise edge of the second channel bottom wall and separated by a root gap and forming a second weld joint within the root gap to join the second lengthwise edge of the first channel bottom wall to the second lengthwise edge of the second channel bottom wall to form a tubular support beam having a self-draining surface.

In another embodiment of the present invention, a load-carrying structure is provided having at least one tubular support beam. The at least one tubular support beam comprising, a first channel having at least a first channel side wall and a first channel bottom wall, wherein a first lengthwise edge of the first channel side wall is contiguous with and forms a substantially 90° interior angle with a first lengthwise edge of the first channel bottom wall and a second channel having at least a second channel side wall and a second channel bottom wall, wherein a first lengthwise edge of the second channel side wall is contiguous with and forms a substantially 90° interior angle with a first lengthwise edge of the second channel bottom wall, and wherein at least one of the first channel or the second channel comprising a top wall, wherein a first lengthwise edge of the top wall is contiguous with and forms an interior angle greater than 90° with either a second lengthwise edge of the first channel side wall or a second lengthwise edge of the second channel side wall. The tubular support beam further comprising, a weld joint to join the first channel and the second channel at a second lengthwise edge of the top wall of the first channel or the second channel, wherein a second lengthwise edge of the first channel bottom wall is aligned with a second lengthwise edge of the second channel bottom wall and separated by a root gap and a second weld joint formed within the root gap to join the second lengthwise edge of the first channel bottom wall to the second lengthwise edge of the second channel bottom wall, forming a tubular support beam. The load-carrying structure further includes, at least one receiving member having notched openings in a first side configured to receive the top wall of the tubular support beam; and at least one support leg coupled substantially perpendicular to the first channel bottom wall and the second channel bottom wall of the tubular support beam.

Accordingly, the present invention provides an improved self-draining structural support beam that can be incorporated into hygienically designed food processing equipment, which eliminates undesirable horizontal surfaces. The use of the self-draining structural support beam in food processing equipment simplifies the sanitation process of the equipment and reduces the cost of the equipment by requiring fewer vertical support legs between horizontal support sections.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

FIG. 2A is a diagrammatic view of a tubular support beam having a self-draining surface in accordance with an embodiment of the present invention illustrating a first channel and a second channel, wherein the angle formed between the side walls and the substantially planar top walls is approximately 105°.

FIG. 2B is a diagrammatic view of a corner section of a tubular support beam having a self-draining surface in accordance with an embodiment of the present invention illustrating the joining of the top walls of the first channel and the second channel.

DETAILED DESCRIPTION

The present invention provides a tubular support beam having a self-draining surface. The self-draining support beam can be incorporated into hygienically designed food processing equipment to eliminate undesirable horizontal surface, which are prone to harboring standing water and bacteria. Additionally, the self-draining support beam of the present invention has an increased load-carrying capability, thereby requiring fewer vertical support legs to support a horizontal platform or walkway.

Figure 1A:
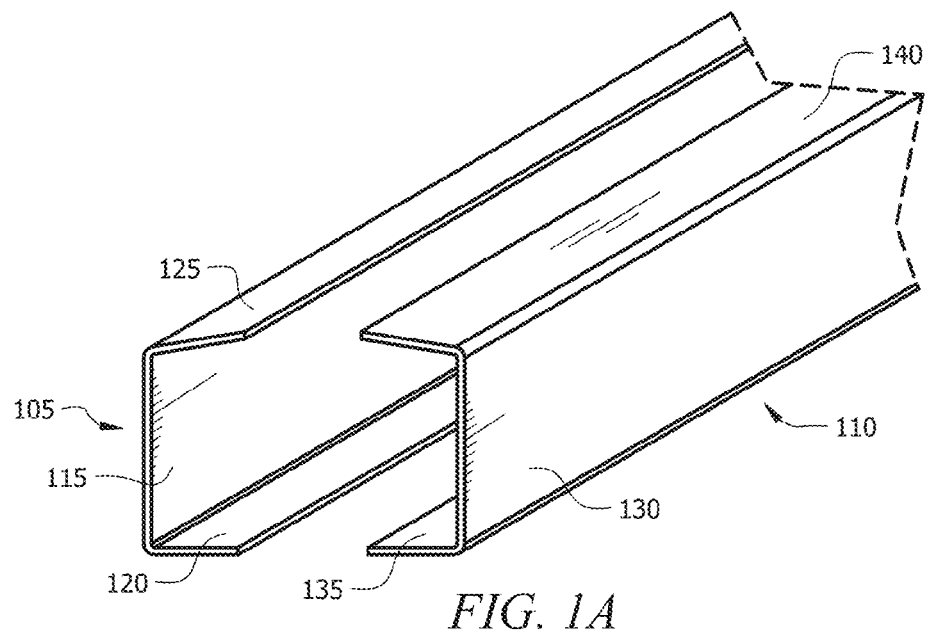
FIG. 1A is a diagrammatic view of a tubular support beam having a self-draining surface in accordance with an embodiment of the present invention illustrating a first channel and a second channel, wherein the angle formed between the side walls and the substantially planar top walls is approximately 105°.

With reference to FIG. 1A, in accordance with an embodiment of the present invention, a tubular support beam includes a first channel 105 having at least a first channel side wall 115 and a first channel bottom wall 120, wherein a first lengthwise edge of the first channel side wall 115 is contiguous with and forms a substantially 90° angle with a first lengthwise edge of the first channel bottom wall 120. The tubular support beam further includes, a second channel 110 having at least a second channel side wall 130 and a second channel bottom wall 135, wherein a first lengthwise edge of the second channel side wall 130 is contiguous with and forms a substantially 90° degree angle with a first lengthwise edge of the second channel bottom wall 135. In order to provide a self-draining top surface for the tubular support beam, the first channel 105 includes a top wall 125 having a first lengthwise edge that is contiguous with and forms an angle greater than 90° with a second lengthwise edge of the first channel side wall 115 and the second channel 110 includes a top wall 140 having a lengthwise edge that is contiguous with and forms an angle greater than 90° with a second lengthwise edge of the second channel side wall 130. In this embodiment, the first channel side wall 115, the second channel side wall 130, the first channel bottom wall 120, the second channel bottom wall 135 the first channel top wall 125 and the second channel top wall 140 are substantially planar.

Figure 1B:
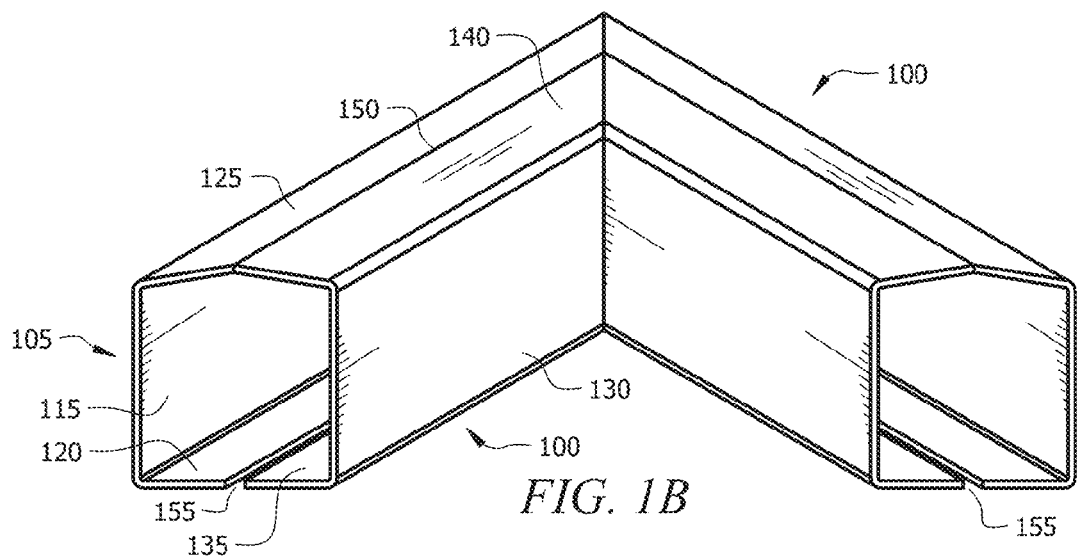
FIG. 1B is a diagrammatic view of a corner section of a tubular support beam having a self-draining surface in accordance with an embodiment of the present invention illustrating the joining of the top walls of the first channel and the second channel.

With reference to FIG. 1B, the tubular support beam 100 is fabricated from the individual first channel 105 and second channel 110 by joining the first channel 105 to the second channel 110 to create a self-draining surface. The tubular support beam 100 is created by first forming a first weld joint 150 at a second lengthwise edge of the top wall 125 of the first channel 105 and a second lengthwise edge of the top wall 140 of the second channel 110. In one embodiment, the first weld joint 150 is a corner-to-corner joint.

After welding the second lengthwise edge of the top wall 125 of the first channel 105 to the second lengthwise edge of the top wall 140 of the second channel 110, a second lengthwise edge of the first channel bottom wall 120 will be aligned with a second lengthwise edge of the second channel bottom wall 135 and the bottom walls 120, 135 will be separated by a root gap 155. The width of the root gap 155 may vary, depending upon the thickness of the stainless steel sheet and other factors. In general, the root gap 155 to be subsequently welded should not be too narrow, or the root may be inadequately fused during welding, thereby reducing the strength of the butt weld. Alternatively, the root gap 155 should not be set too wide because the weld metal may pass through the opening without creating a weld. The function of the root gap 155 is to increase the depth of penetration down to the root of the weld when welding from only one side of the metal.

Figure 1C:
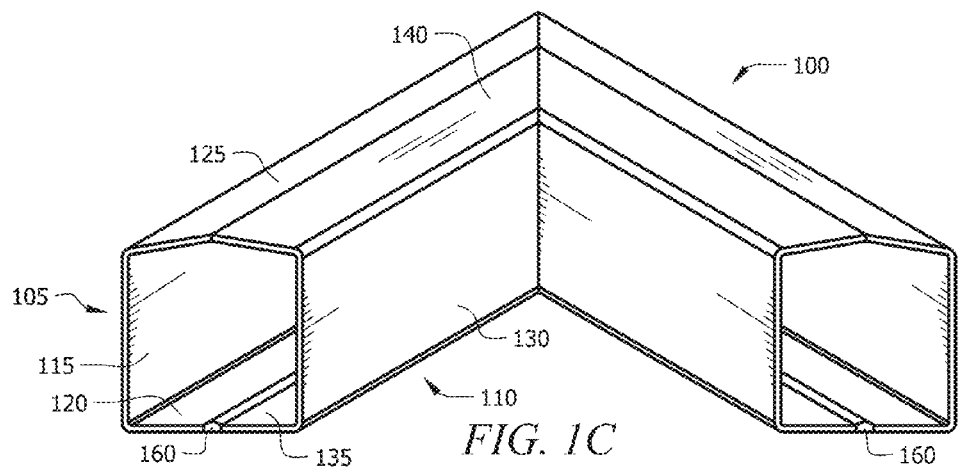
FIG. 1C is a diagrammatic view of a corner section of a tubular support beam having a self-draining surface in accordance with an embodiment of the present invention illustrating the joining of the bottom walls of the first channel and the second channel.

As shown with reference to FIG. 1C, to complete the tubular support beam 100, a second weld joint 160 is formed within the root gap 155 to join the second lengthwise edge of the first channel bottom wall 120 to the second lengthwise edge of the second channel bottom wall 135, thereby forming the tubular support beam 100 having a self-draining surface formed by the top wall 125 of the first channel 105 and the top wall 140 of the second channel 110. In one embodiment, the second weld joint 160 is a butt weld joint, and in particular, a square butt weld joint. The butt weld joint fills the root gap and provides a substantially flush surface with the exterior of the bottom wall of the first channel 105 and the second channel 110 and allows for welding when access is only available from the exterior of the tubular support beam.

In one embodiment, the first channel 105 and the second channel 110 may be fabricated from individual stainless steel plates that are sheared to the appropriate size and then manipulated to form the shape of the first channel 105 and the second channel 110. In a particular embodiment, the stainless steel plate may be a 7-gauge stainless steel plate.

Figure 1D:
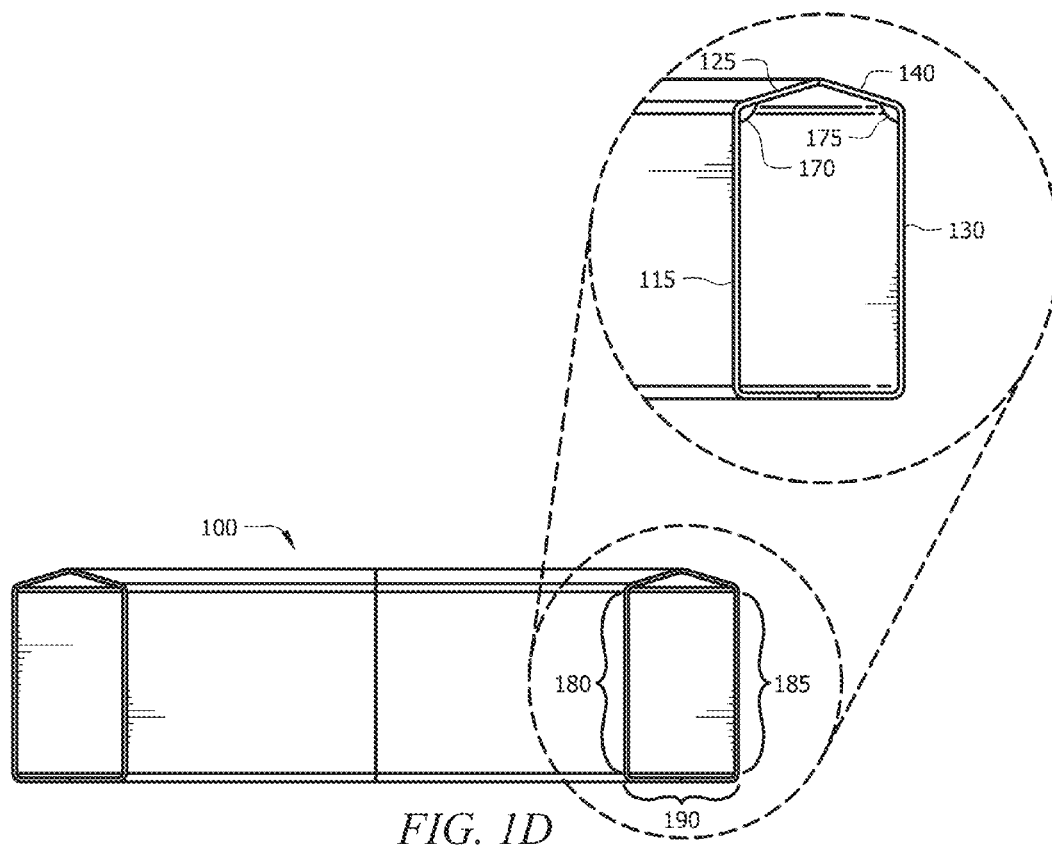
FIG. 1D is a diagrammatic view of a corner section of a tubular support beam having a self-draining surface in accordance with an embodiment of the present invention illustrating the dimensions of the first channel and the second channel, wherein the height of the peak of the self-draining surface is approximately 11¼ inches and the width of the beam is approximately 6 inches.

With reference to FIG. 1D, the self-draining surface of the tubular support beam is formed by the angled surface created at the intersection of the second lengthwise edge of the first channel top wall 125 and the second lengthwise edge of the second channel top wall 140. In this embodiment, both the first channel top wall 125 and the second channel top wall 140 are substantially planar. The slope of the self-draining surface may vary and is determined by the interior angle 170 formed between the second lengthwise edge of the first channel side wall 115 and the first lengthwise edge of the first channel top wall 125 and the interior angle 175 formed between the second lengthwise edge of the second channel side wall 130 and the first lengthwise edge of the second channel top wall 140. The interior angles 170, 175 may be substantially equal or alternatively, they may be substantially unequal. To provide for adequate draining of fluids from the surface of the tubular support beam 100, the interior angles 170, 175 may vary between about 92° and about 135°. In the embodiment illustrated, the interior angles 170, 175 are approximately 105°.

The first channel side wall 115 and the second channel side wall 130 are substantially planar and substantially parallel. The height 180 of the first channel side wall 115 and the height 185 of the second channel side 130 may be varied to increase the load-carrying capability of the tubular support beam 100 over a given span. By increasing the height 180 of the first channel side wall 115 and the height 185 of the second channel side wall 130, relative to the width 190 of the tubular support beam 100 established by the first channel bottom wall 120 and the second channel bottom 135, the load-carrying capability of the tubular support beam 100 can be increased. As such, in the present invention, the height of the first channel side and the second channel side wall can be adjusted to accommodate a desired load-carrying capability while maintaining the self-draining geometry of the tubular support beam.

In general, it is desirable that the height 180, 185 of the side walls of the tubular support beam 100 be greater than the width 190 of the bottom walls of the tubular support beam 100 to improve the load-carrying capability of the beam. In the particular embodiment illustrated in FIG. 1D, the height 180 of the first channel side wall 115 and the height of the second channel side wall 130 are such that the peak of the self-draining surface is approximately 11¼ inches and the width 190 of the tubular support beam 100 is approximately 6 inches.

With reference to FIG. 2A, in accordance with an additional embodiment of the present invention, a tubular support beam 200 is illustrated having shorter sidewalls, as compared to the embodiment in FIG. 1A-1D, while maintaining the same slope of the self-draining surface. In this embodiment, the tubular support beam includes a first channel 205 having at least a first channel side wall 215 and a first channel bottom wall 220, wherein a first lengthwise edge of the first channel side wall 215 is contiguous with and forms a substantially 90° angle with a first lengthwise edge of the first channel bottom wall 220. The tubular support beam further includes, a second channel 210 having at least a second channel side wall 230 and a second channel bottom wall 235, wherein a first lengthwise edge of the second channel side wall 230 is contiguous with and forms a substantially 90° degree angle with a first lengthwise edge of the second channel bottom wall 235. In order to provide a self-draining top surface for the tubular support beam, the first channel 205 includes a top wall 225 having a first lengthwise edge that is contiguous with and forms an angle greater than 90° with a second lengthwise edge of the first channel side wall 215 and the second channel 210 includes a top wall 240 having a lengthwise edge that is contiguous with and forms an angle greater than 90° with a second lengthwise edge of the second channel side wall 230. In this embodiment, the first channel side wall 215, the second channel side wall 230, the first channel bottom wall 220, the second channel bottom wall 235 the first channel top wall 225 and the second channel top wall 240 are substantially planar.

With reference to FIG. 2B, the tubular support beam 200 is fabricated from the individual first channel 205 and second channel 210 by joining the first channel 205 to the second channel 210 to create a self-draining surface. The tubular support beam 200 is created by first forming a first weld joint 250 at a second lengthwise edge of the top wall 225 of the first channel 205 and a second lengthwise edge of the top wall 240 of the second channel 210. In one embodiment, the first weld joint 250 is a corner-to-corner joint. After welding the second lengthwise edge of the top wall 225 of the first channel 205 to the second lengthwise edge of the top wall 240 of the second channel 210, a second lengthwise edge of the first channel bottom wall 220 will be aligned with a second lengthwise edge of the second channel bottom wall 235 and the bottom walls 220, 235 will be separated by a root gap 255.

Figure 2C:
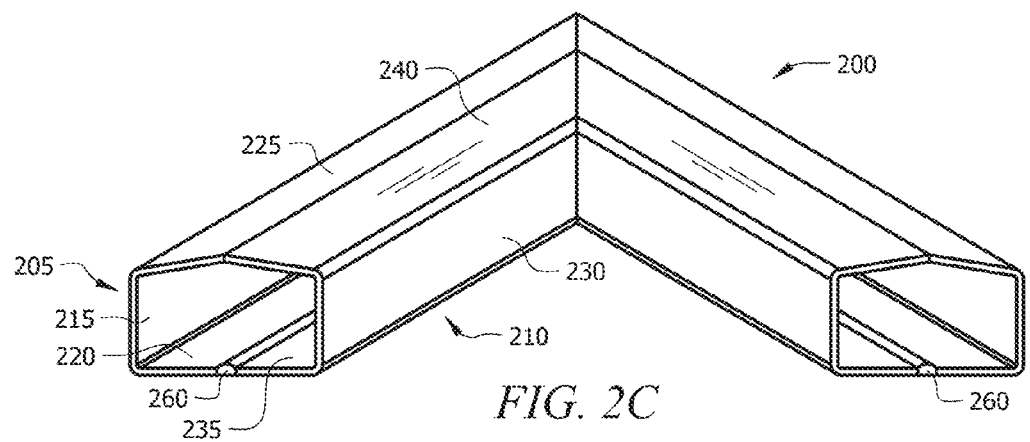
FIG. 2C is a diagrammatic view of a corner section of a tubular support beam having a self-draining surface in accordance with an embodiment of the present invention illustrating the joining of the bottom walls of the first channel and the second channel.

As shown with reference to FIG. 2C, to complete the tubular support beam 200, a second weld joint 260 is formed within the root gap 255 to join the second lengthwise edge of the first channel bottom wall 220 to the second lengthwise edge of the second channel bottom wall 235, thereby forming the tubular support beam 200 having a self-draining surface formed by the top wall 225 of the first channel 205 and the top wall 240 of the second channel 210. In one embodiment, the second weld joint 260 is a butt weld joint, and in particular, a square butt weld joint.

Figure 2D:
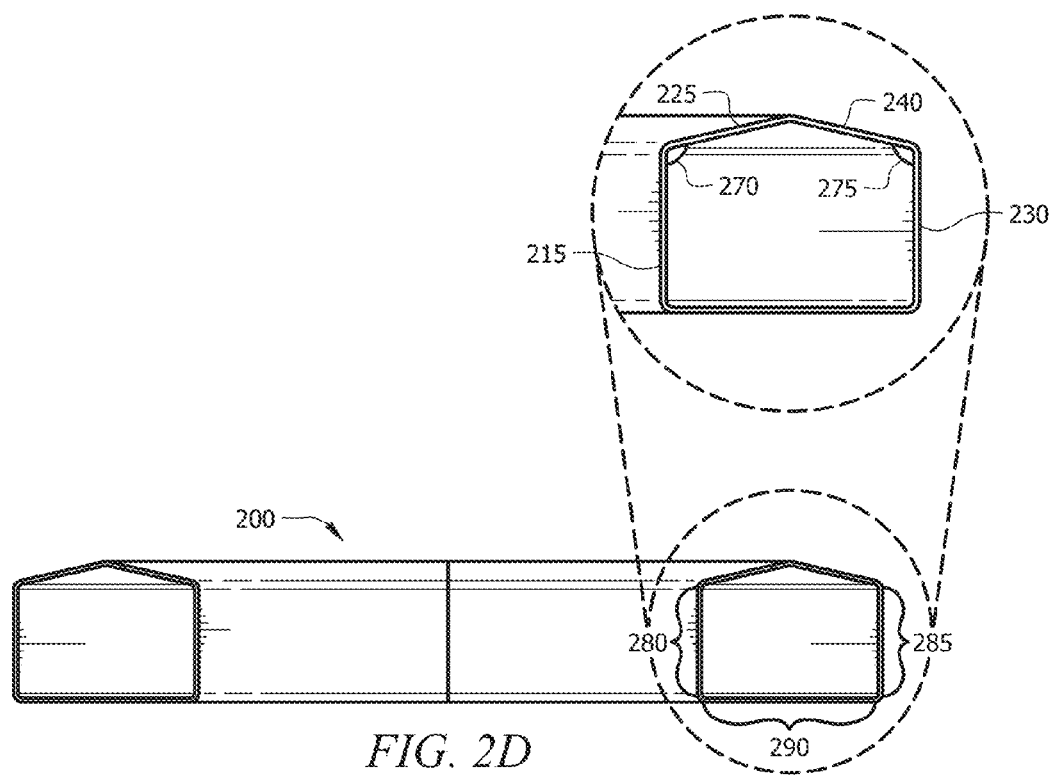
FIG. 2D is a diagrammatic view of a corner section of a tubular support beam having a self-draining surface in accordance with an embodiment of the present invention illustrating the dimensions of the first channel and the second channel, wherein the height of the peak of the self-draining surface is approximately 11¼ inches and the width of the beam is approximately 6 inches.

With reference to FIG. 2D, the self-draining surface of the tubular support beam is formed by the angled surface created at the intersection of the second lengthwise edge of the first channel top wall 225 and the second lengthwise edge of the second channel top wall 240. In this embodiment, both the first channel top wall 225 and the second channel top wall 240 are substantially planar. The slope of the self-draining surface may vary and is determined by the interior angle 270 formed between the second lengthwise edge of the first channel side wall 215 and the first lengthwise edge of the first channel top wall 225 and the interior angle 275 formed between the second lengthwise edge of the second channel side wall 230 and the first lengthwise edge of the second channel top wall 240. The interior angles 270, 275 may be substantially equal or alternatively, they may be substantially unequal. To provide for adequate draining of fluids from the surface of the tubular support beam 200, the interior angles 270, 275 may vary between about 92° and about 135°. In the embodiment illustrated, the interior angles 270, 275 are approximately 105°.

In the particular embodiment illustrated in FIG. 2D, the sidewalls 215, 230 are of substantially equal height, the bottom walls 220, 235 of are of substantially equal width and the top walls 225, 240 are of substantially equal length. In the embodiment illustrated in FIG. 1D, the height 280 of the first channel side wall 215 and the height 285 of the second channel side wall 230 are such that the peak of the self-draining surface is approximately 6¼ inches and the width 290 of the tubular support beam 200 is approximately 6 inches.

Figure 3A:
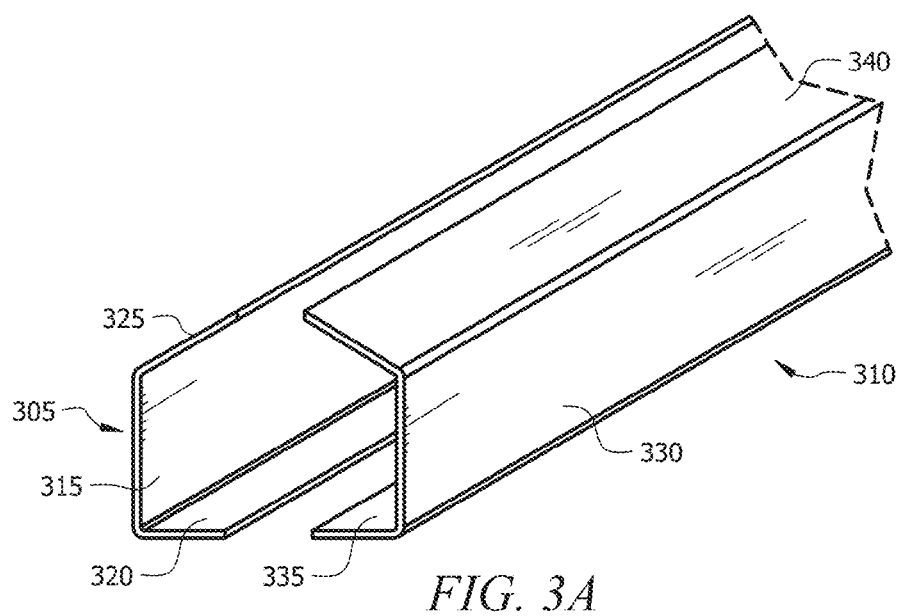
FIG. 3A is a diagrammatic view of a tubular support beam having a self-draining surface in accordance with an embodiment of the present invention illustrating a first channel and a second channel, wherein the angle formed between the side walls and the substantially planar top walls is approximately 135°.

With reference to FIG. 3A, in accordance with an additional embodiment of the present invention, a tubular support beam 300 is illustrated having similar height sidewalls, as compared to the embodiment in FIG. 1A-1D, and a steeper slope for the self-draining surface. In this embodiment, the tubular support beam includes a first channel 305 having at least a first channel side wall 315 and a first channel bottom wall 320, wherein a first lengthwise edge of the first channel side wall 315 is contiguous with and forms a substantially 90° angle with a first lengthwise edge of the first channel bottom wall 320. The tubular support beam further includes, a second channel 310 having at least a second channel side wall 330 and a second channel bottom wall 335, wherein a first lengthwise edge of the second channel side wall 330 is contiguous with and forms a substantially 90° degree angle with a first lengthwise edge of the second channel bottom wall 335. In order to provide a self-draining top surface for the tubular support beam, the first channel 305 includes a top wall 325 having a first lengthwise edge that is contiguous with and forms an angle greater than 90° with a second lengthwise edge of the first channel side wall 315 and the second channel 310 includes a top wall 340 having a lengthwise edge that is contiguous with and forms an angle greater than 90° with a second lengthwise edge of the second channel side wall 330. In this embodiment, the first channel side wall 315, the second channel side wall 330, the first channel bottom wall 320, the second channel bottom wall 335 the first channel top wall 325 and the second channel top wall 340 are substantially planar.

Figure 3B:
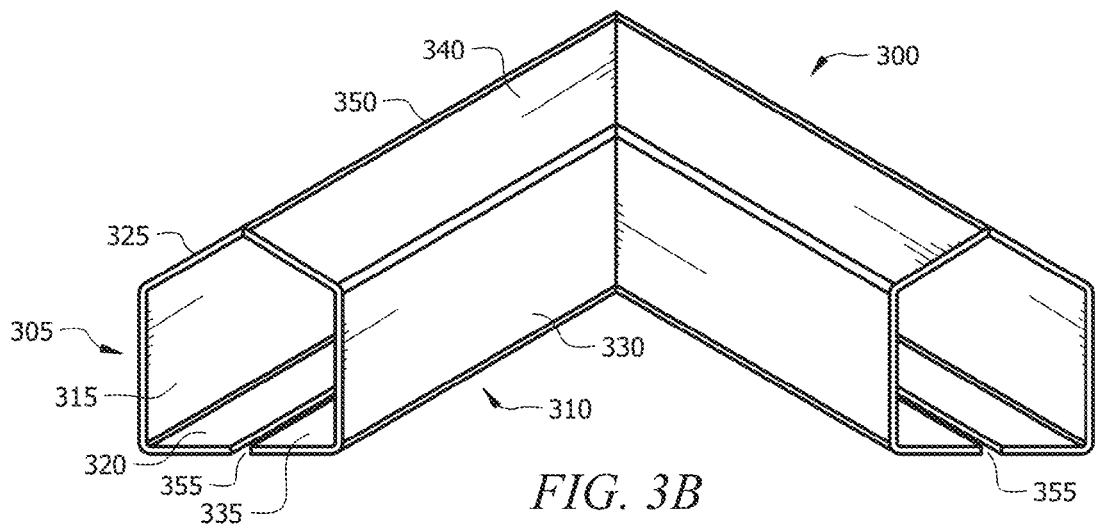
FIG. 3B is a diagrammatic view of a corner section of a tubular support beam having a self-draining surface in accordance with an embodiment of the present invention illustrating the joining of the top walls of the first channel and the second channel.

With reference to FIG. 3B, the tubular support beam 300 is fabricated from the individual first channel 305 and second channel 310 by joining the first channel 305 to the second channel 310 to create a self-draining surface. The tubular support beam 300 is created by first forming a first weld joint 350 at a second lengthwise edge of the top wall 325 of the first channel 305 and a second lengthwise edge of the top wall 340 of the second channel 310. In one embodiment, the first weld joint 350 is a corner-to-corner joint. After welding the second lengthwise edge of the top wall 325 of the first channel 305 to the second lengthwise edge of the top wall 340 of the second channel 310, a second lengthwise edge of the first channel bottom wall 320 will be aligned with a second lengthwise edge of the second channel bottom wall 335 and the bottom walls 320, 335 will be separated by a root gap 355.

Figure 3C:
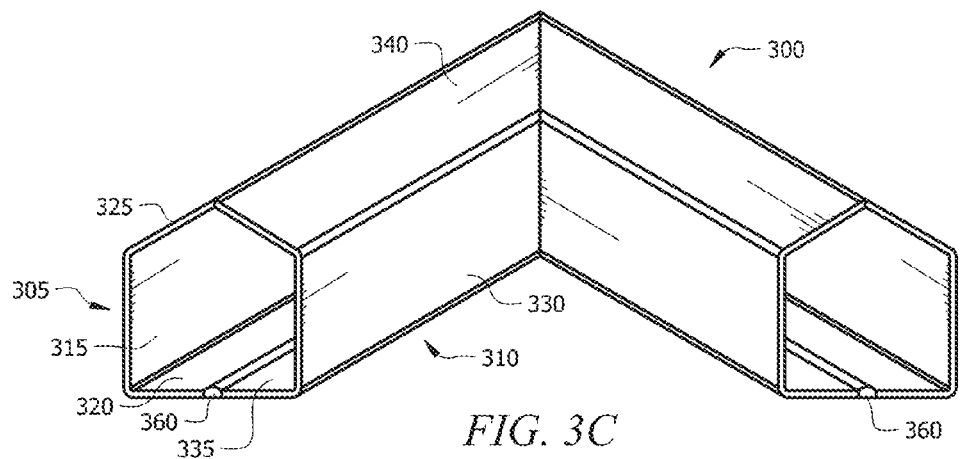
FIG. 3C is a diagrammatic view of a corner section of a tubular support beam having a self-draining surface in accordance with an embodiment of the present invention illustrating the joining of the bottom walls of the first channel and the second channel.

As shown with reference to FIG. 3C, to complete the tubular support beam 300, a second weld joint 360 is formed within the root gap 355 to join the second lengthwise edge of the first channel bottom wall 320 to the second lengthwise edge of the second channel bottom wall 335, thereby forming the tubular support beam 300 having a self-draining surface formed by the top wall 325 of the first channel 305 and the top wall 340 of the second channel 310. In one embodiment, the second weld joint 360 is a butt weld joint, and in particular, a square butt weld joint.

Figure 3D:
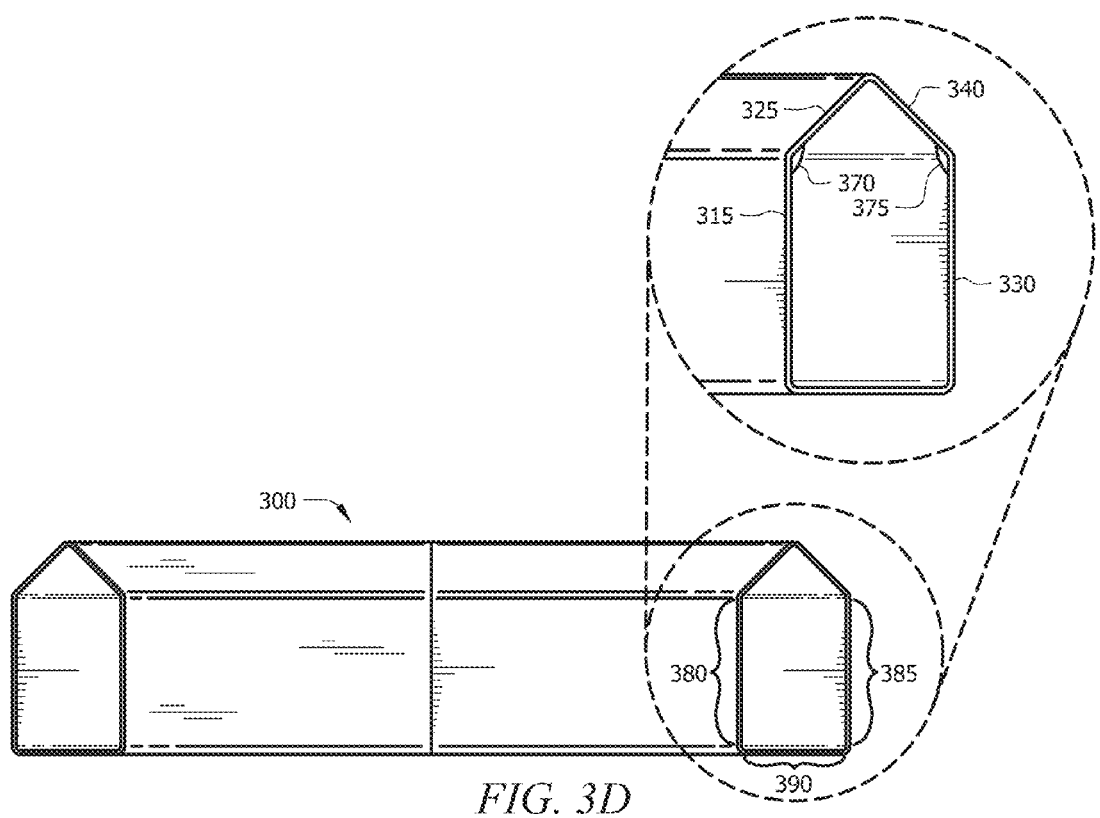
FIG. 3D is a diagrammatic view of a corner section of a tubular support beam having a self-draining surface in accordance with an embodiment of the present invention illustrating the dimensions of the first channel and the second channel, wherein the height of the peak of the self-draining surface is approximately 11¼ inches and the width of the beam is approximately 6 inches.

With reference to FIG. 3D, the self-draining surface of the tubular support beam is formed by the angled surface created at the intersection of the second lengthwise edge of the first channel top wall 325 and the second lengthwise edge of the second channel top wall 340. In this embodiment, both the first channel top wall 325 and the second channel top wall 340 are substantially planar. The slope of the self-draining surface may vary and is determined by the interior angle 370 formed between the second lengthwise edge of the first channel side wall 315 and the first lengthwise edge of the first channel top wall 325 and the interior angle 375 formed between the second lengthwise edge of the second channel side wall 330 and the first lengthwise edge of the second channel top wall 340. The interior angles 370, 375 may be substantially equal or alternatively, they may be substantially unequal. To provide for adequate draining of fluids from the surface of the tubular support beam 300, the interior angles 370, 375 may vary between about 92° and about 135°. In the embodiment illustrated, the interior angles 370, 375 are approximately 135°.

In the particular embodiment illustrated in FIG. 3D, the sidewalls 315, 330 are of substantially equal height, the bottom walls 320, 335 of are of substantially equal width and the top walls 325, 340 are of substantially equal length. In this embodiment, the height 380 of the first channel side wall 315 and the height 385 of the second channel side wall 330, plus the height created by the sloped self-draining surface, is approximately 11¼ inches and the width 390 of the tubular support beam 300 is approximately 6 inches.

Figure 4A:
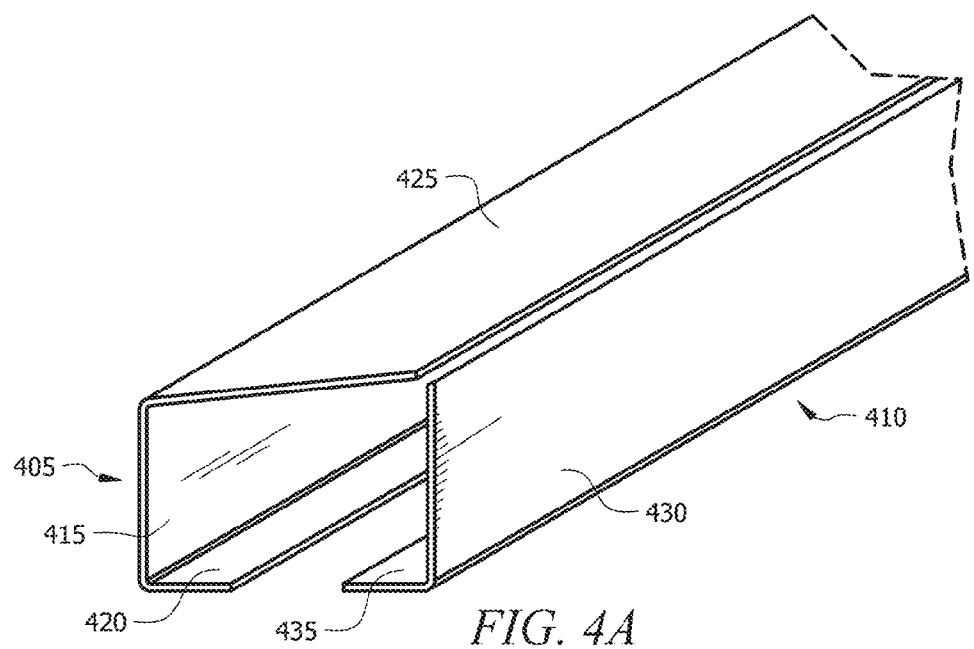
FIG. 4A is a diagrammatic view of a tubular support beam having a self-draining surface in accordance with an embodiment of the present invention illustrating a first channel and a second channel, wherein one substantially planar top wall forming the self-draining surface forms an angle of approximately 135° with a side wall.

With reference to FIG. 4A, in accordance with an additional embodiment of the present invention, a tubular support beam 400 is illustrated having only a single top wall 425 that is contiguous with the side wall 415 of the first channel 405 to form the self-draining surface. In an alternative embodiment, the single top wall could be contiguous with the side wall 430 of the second channel 410. In this embodiment, the tubular support beam includes a first channel 405 having at least a first channel side wall 415 and a first channel bottom wall 420, wherein a first lengthwise edge of the first channel side wall 415 is contiguous with and forms a substantially 90° angle with a first lengthwise edge of the first channel bottom wall 420. The tubular support beam further includes, a second channel 410 having at least a second channel side wall 430 and a second channel bottom wall 435, wherein a first lengthwise edge of the second channel side wall 430 is contiguous with and forms a substantially 90° degree angle with a first lengthwise edge of the second channel bottom wall 435. In order to provide a self-draining top surface for the tubular support beam, the second channel 410 includes a top wall 440 having a lengthwise edge that is contiguous with and forms an angle greater than 90° with a second lengthwise edge of the second channel side wall 430. In this embodiment, the first channel side wall 415, the second channel side wall 430, the first channel bottom wall 420, the second channel bottom wall 435 the first channel top wall 425 and the second channel top wall 440 are substantially planar.

Figure 4B:
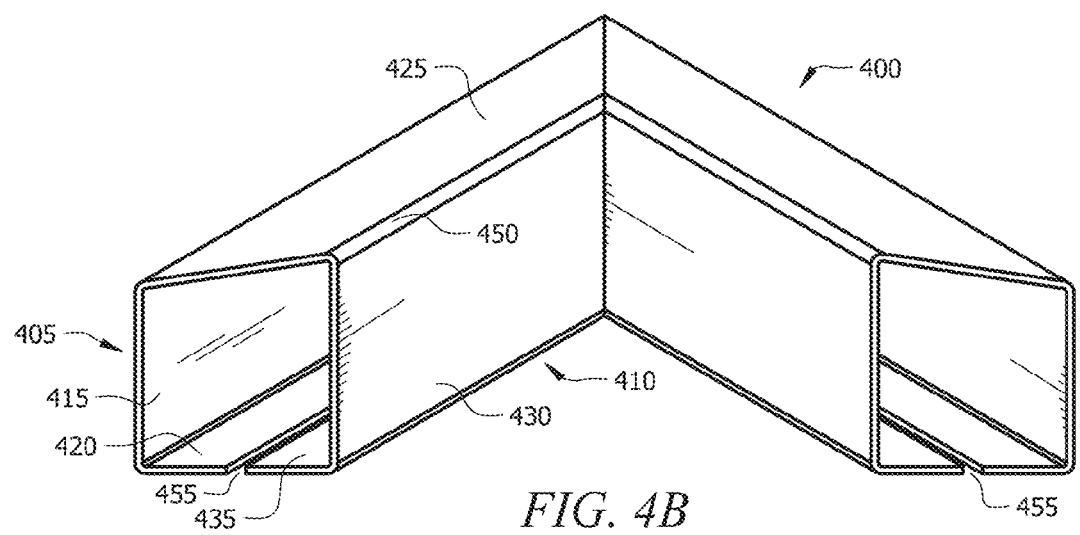
FIG. 4B is a diagrammatic view of a corner section of a tubular support beam having a self-draining surface in accordance with an embodiment of the present invention illustrating the joining of the top wall of the first channel and the side wall of the second channel.

With reference to FIG. 4B, the tubular support beam 400 is fabricated from the individual first channel 405 and second channel 410 by joining the first channel 405 to the second channel 410 to create a self-draining surface. The tubular support beam 400 is created by first forming a first weld joint 450 at a second lengthwise edge of the top wall 425 of the first channel 405 and a second lengthwise edge of the side wall 430 of the second channel 410. In one embodiment, the first weld joint 450 is a corner-to-corner joint. After welding the second lengthwise edge of the side wall 430 of the second channel 410 to the second lengthwise edge of the top wall 425 of the first channel 405, a second lengthwise edge of the first channel bottom wall 420 will be aligned with a second lengthwise edge of the second channel bottom wall 435 and the bottom walls 420, 435 will be separated by a root gap 455.

Figure 4C:
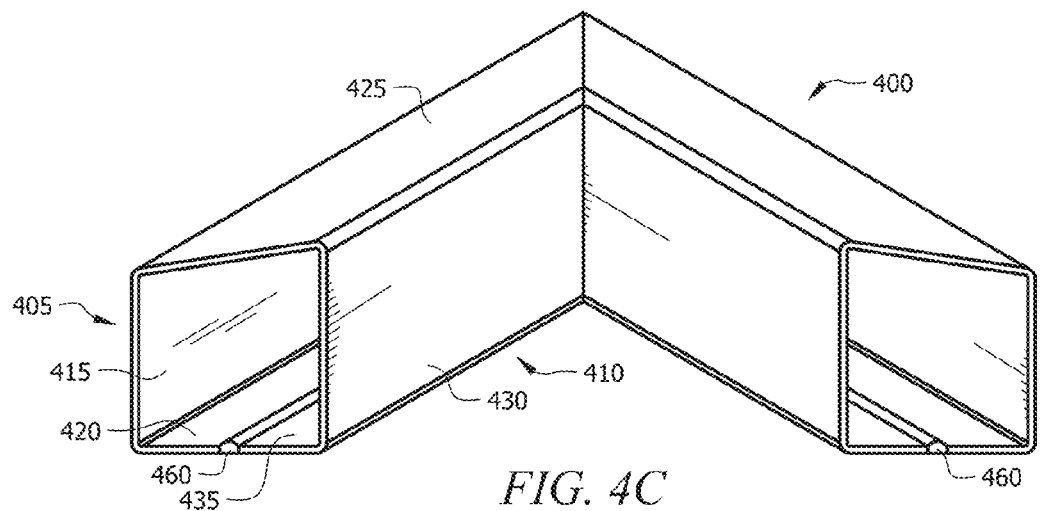
FIG. 4C is a diagrammatic view of a corner section of a tubular support beam having a self-draining surface in accordance with an embodiment of the present invention illustrating the joining of the bottom wall of the first channel and the bottom wall of the second channel.

As shown with reference to FIG. 4C, to complete the tubular support beam 400, a second weld joint 460 is formed within the root gap 455 to join the second lengthwise edge of the first channel bottom wall 420 to the second lengthwise edge of the second channel bottom wall 435, thereby forming the tubular support beam 400 having a self-draining surface formed by the top wall 440 of the second channel 410. In one embodiment, the second weld joint 460 is a butt weld joint, and in particular, a square butt weld joint.

Figure 4D:
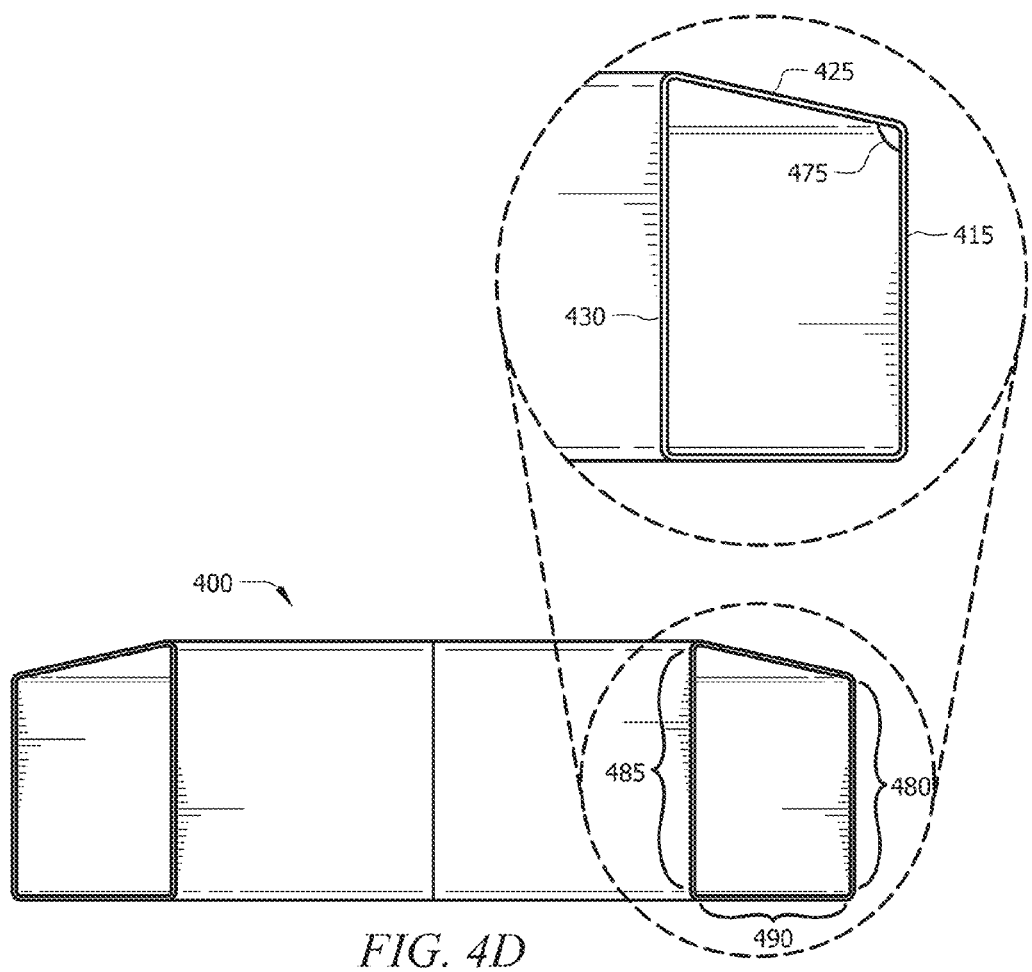
FIG. 4D is a diagrammatic view of a corner section of a tubular support beam having a self-draining surface in accordance with an embodiment of the present invention illustrating the dimensions of the first channel and the second channel, wherein the height of the peak of the self-draining surface is approximately 11¼ inches and the width of the beam is approximately 6 inches.

With reference to FIG. 4D, the self-draining surface of the tubular support beam is formed by the angled surface created at the intersection of the second lengthwise edge of the first channel top wall 425 and the second lengthwise edge of the second channel side wall 430. In this embodiment, the first channel top wall 425 is substantially planar. The slope of the self-draining surface may vary and is determined by the interior angle 475 formed between the second lengthwise edge of the first channel side wall 415 and the first lengthwise edge of the first channel top wall 425. To provide for adequate draining of fluids from the surface of the tubular support beam 400, the interior angle 475 may vary between about 92° and about 135°. In the embodiment illustrated, the interior angle 475 is approximately 135°.

In the particular embodiment illustrated in FIG. 3D, the bottom walls 420, 435 are of substantially equal width. However, the height of the second channel 410 side wall 430 is greater than the height of the first channel 405 side wall 415 to establish the desired slope of the self-draining surface provided by the top wall 425 of the first channel 405. In this particular embodiment, the height 480 of the first channel side wall 415, plus the height created by the sloped self-draining surface, is approximately 11¼ inches and the width 490 of the tubular support beam 400 is approximately 6 inches.

Figure 5A:
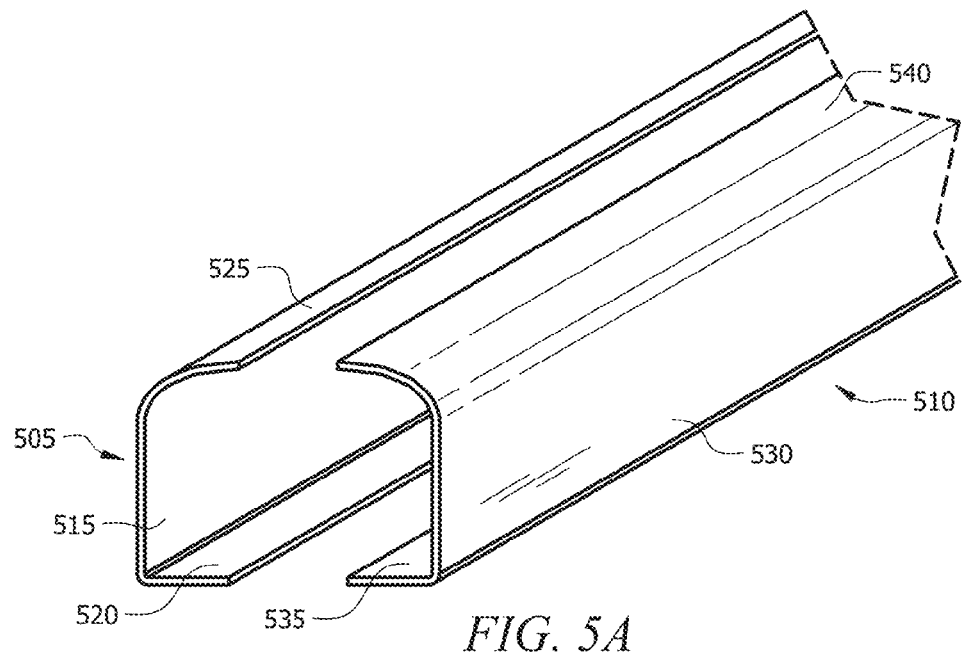
FIG. 5A is a diagrammatic view of a tubular support beam having a self-draining surface in accordance with an embodiment of the present invention illustrating a first channel and a second channel, wherein the self-draining surface is formed by two convex top walls that form a curved surface.

With reference to FIG. 5A, in accordance with an additional embodiment of the present invention, a tubular support beam 500 is illustrated having a convex, or dome shaped, self-draining surface formed by a convex top wall 525 of the first channel 505 and a convex top wall 540 of the second channel 510. In this embodiment, the tubular support beam includes a first channel 505 having at least a first channel side wall 515 and a first channel bottom wall 520, wherein a first lengthwise edge of the first channel side wall 515 is contiguous with and forms a substantially 90° angle with a first lengthwise edge of the first channel bottom wall 520. The tubular support beam further includes, a second channel 510 having at least a second channel side wall 530 and a second channel bottom wall 535, wherein a first lengthwise edge of the second channel side wall 530 is contiguous with and forms a substantially 90° degree angle with a first lengthwise edge of the second channel bottom wall 535. In order to provide a self-draining top surface for the tubular support beam, the first channel 505 includes a top wall 525 that is convex relative to the interior of the support beam and that has a lengthwise edge that is contiguous with and forms an angle greater than 90° with a second lengthwise edge of the first channel side wall 525. The convex first channel top wall 525 is joined to a convex top wall 90° with a second lengthwise edge of the first channel side wall 525 of the second channel 90° with a second lengthwise edge of the first channel side wall 525 that has a lengthwise edge that is contiguous with and forms an angle greater than 90° with a second lengthwise edge of the second channel side wall 530. In this embodiment, the first channel side wall 515, the second channel side wall 530, the first channel bottom wall 520, the second channel bottom wall 535 are substantially planar.

Figure 5B:
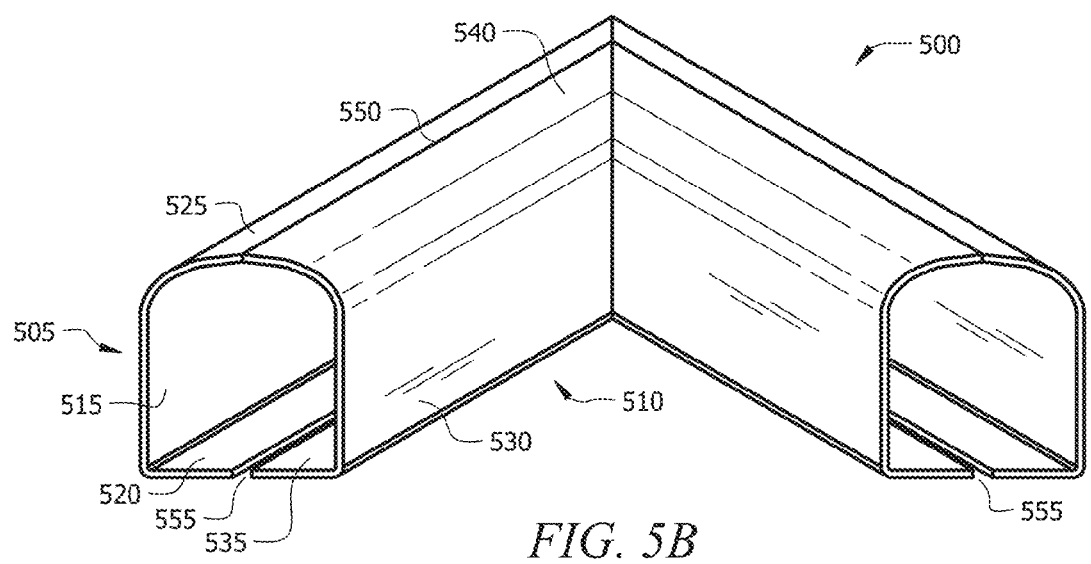
FIG. 5B is a diagrammatic view of a corner section of a tubular support beam having a self-draining surface in accordance with an embodiment of the present invention illustrating the joining of the convex top wall of the first channel and the convex top wall of the second channel.

With reference to FIG. 5B, the tubular support beam 500 is fabricated from the individual first channel 505 and second channel 510 by joining the first channel 505 to the second channel 510 to create a self-draining surface. The tubular support beam 500 is created by first forming a first weld joint 550 at a second lengthwise edge of the top wall 525 of the first channel 505 and a second lengthwise edge of the top wall 540 of the second channel 510. In one embodiment, the first weld joint 550 is a corner-to-corner joint. After welding the second lengthwise edge of the top wall 540 of the second channel 510 to the second lengthwise edge of the top wall 525 of the first channel 505, a second lengthwise edge of the first channel bottom wall 520 will be aligned with a second lengthwise edge of the second channel bottom wall 535 and the bottom walls 520, 535 will be separated by a root gap 555.

Figure 5C:
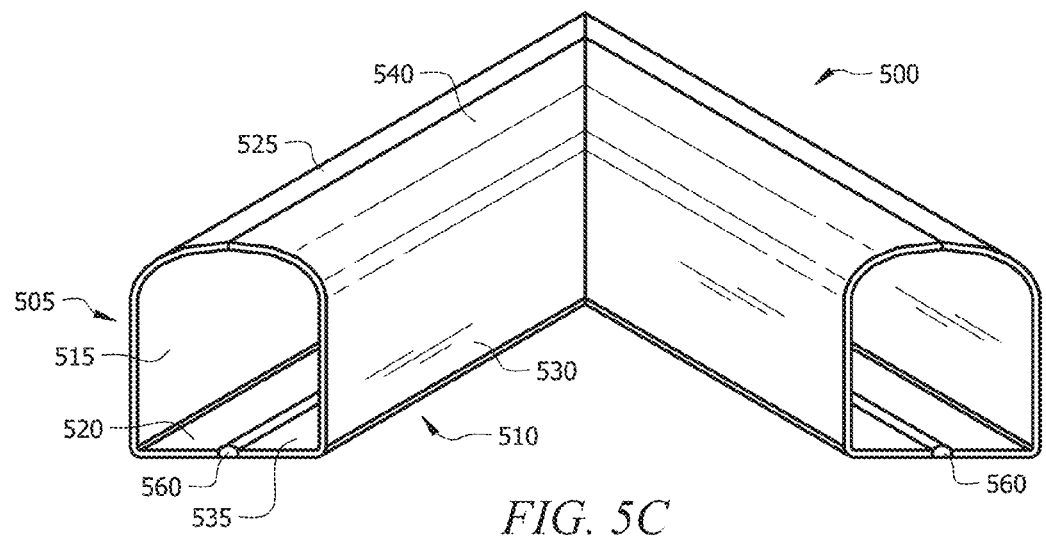
FIG. 5C is a diagrammatic view of a corner section of a tubular support beam having a self-draining surface in accordance with an embodiment of the present invention illustrating the joining of the bottom wall of the first channel and the bottom wall of the second channel.

As shown with reference to FIG. 5C, to complete the tubular support beam 500, a second weld joint 560 is formed within the root gap 555 to join the second lengthwise edge of the first channel bottom wall 520 to the second lengthwise edge of the second channel bottom wall 535, thereby forming the tubular support beam 500 having a self-draining surface formed by the top wall 540 of the second channel 510. In one embodiment, the second weld joint 560 is a butt weld joint, and in particular, a square butt weld joint.

With reference to FIG. 4D, the self-draining surface of the tubular support beam is creation by domed surface created at the intersection of the second lengthwise edge of the first channel top wall 525 and the second lengthwise edge of the second channel top wall 540. In this embodiment, the first channel top wall 525 and the second channel top wall 540 are convex, each of the top walls 525, 540 forming one half of the domed surface. While is the illustrated embodiment, the top wall 525, 540 are of equal size, in other embodiments, it is envisioned that they may be unequal in size. The radius of the self-draining domed surface may vary and is determined in part by the interior angles 570, 575 formed between the side walls 515, 530 and the top walls 525, 540. To provide for adequate draining of fluids from the surface of the tubular support beam 500, the interior angle 575 may vary between about 92° and about 135°. In the embodiment illustrated, the interior angle 575 is approximately 135°.

Figure 5D:
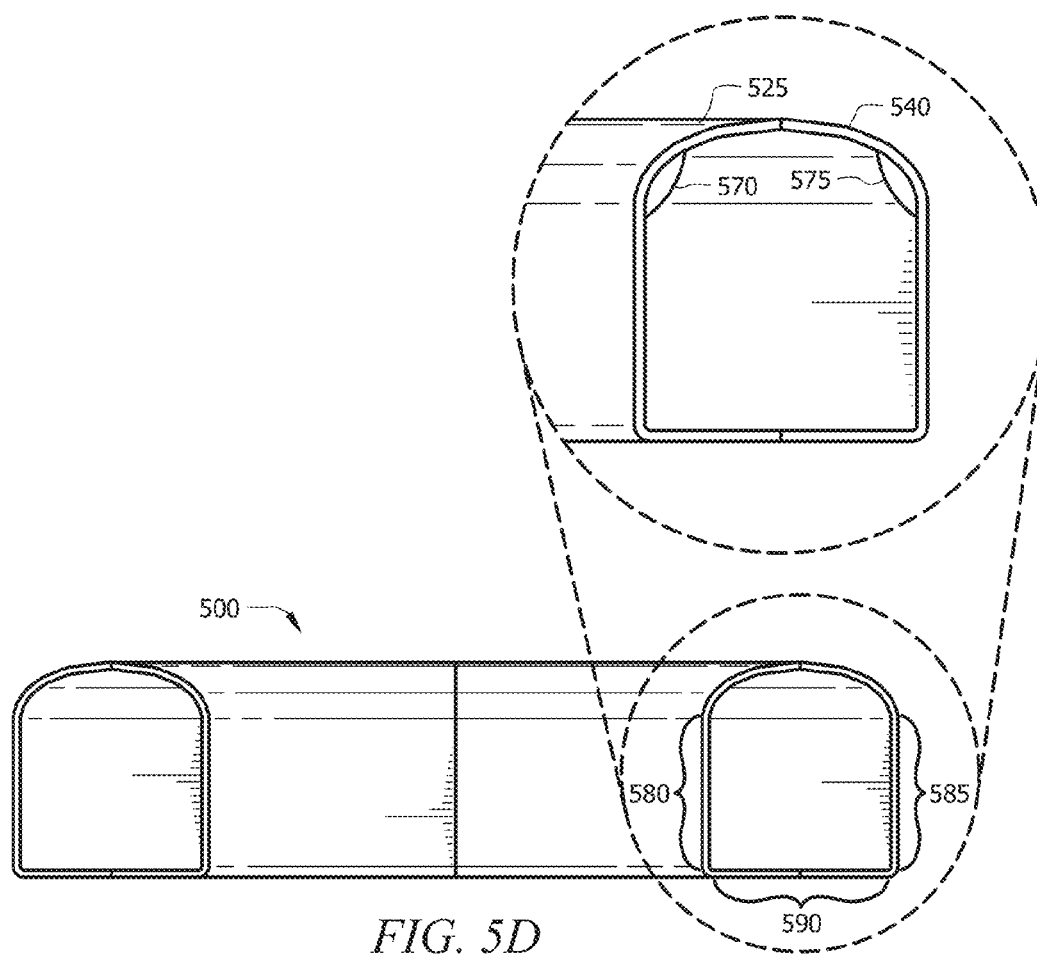
FIG. 5D is a diagrammatic view of a corner section of a tubular support beam having a self-draining surface in accordance with an embodiment of the present invention illustrating the dimensions of the first channel and the second channel, wherein the height of the peak of the self-draining surface is approximately 11¼ inches and the width of the beam is approximately 6 inches.

In the particular embodiment illustrated in FIG. 5D, the sidewalls 515, 530 are of substantially equal height, the bottom walls 520, 535 of are of substantially equal width and the top walls 525, 540 are of substantially equal length. In this embodiment, the height 580 of the first channel side wall 515 and the height 585 of the second channel side wall 530, plus the radius of the curved self-draining surface, is approximately 11¼ inches and the width 590 of the tubular support beam 500 is approximately 6 inches.

Figure 6:
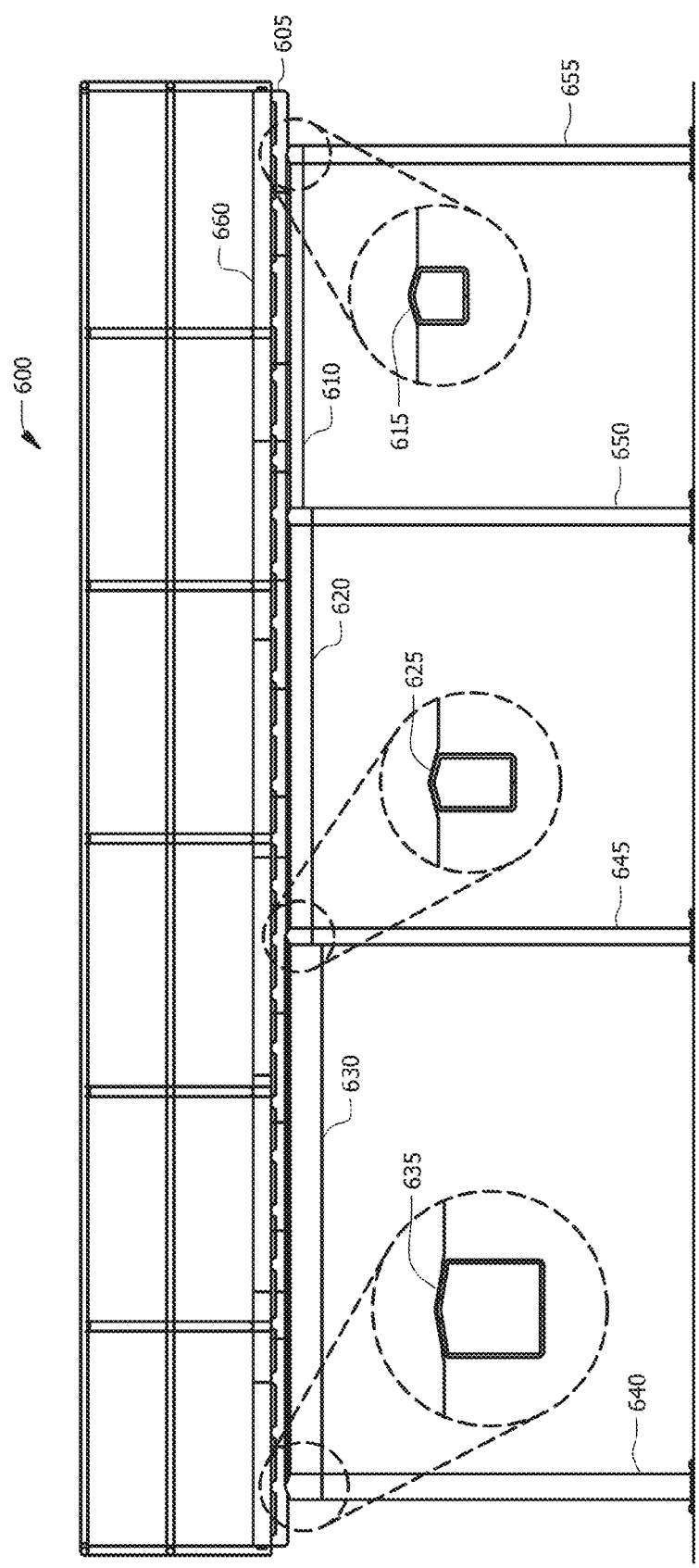
FIG. 6 is a diagrammatic view of a load-bearing food processing platform having at least one self-draining tubular support beam.

With reference to FIG. 6, in a particular embodiment, the self-draining tubular support beam of the present invention may be incorporated into a load-carrying structure, such as a platform or a walkway. The use of the self-draining tubular support beam eliminates the horizontal surfaces of the load-carrying structure, thereby providing hygienically designed processing equipment for food processing facilities.

In the illustrated embodiment of FIG. 6, a load-carrying platform 600 includes at least one self-draining tubular support beam. In this embodiment, three self-draining tubular support beams 630, 620, 610 are illustrated, having varying dimensions. As previously described, the height of the sidewalls of the tubular support beams may be varied to provide the desired load-carrying capability between a span established between vertical support legs 640, 645, 650, 655 of the load-carrying platform. Increasing the height of the sidewalls allows the vertical support legs 640, 645, 650, 655 to be spaced farther apart, thereby reducing the number of vertical support legs 640, 645, 650, 655 necessary to support a desired load. It is desirable to reduce the number of vertical support legs 640, 645, 650, 655 because the overall cost of the platform is reduced and the ability to sanitize the equipment is improved.

As shown in FIG. 6, a first tubular support beam 630 is secured between vertical support leg 640 and 645, a second tubular support beam 620 is secured between vertical support leg 645 and 650 and a third tubular support beam 610 is secured between vertical support leg 650 and 655. Each of the three tubular support beams 630, 620, 610 may be fabricated to different dimensions, as illustrated. Alternatively, each of the three tubular support beams 630, 620, 610 may have substantially identical dimensions. In order to support a walkway or platform 660, a receiving member 605 is positioned adjacent to the self-draining surface of the tubular support beams 630, 620, 610. The receiving member 605 comprises notched openings in a first side adjacent to the tubular support beams to receive the self-draining surface of the tubular support beams 630, 620, 610. As such, the notched openings of the receiving member 605 may be configured to accommodate various slopes 615, 625, 635 of the self-draining surface of the tubular support beams 630, 620, 610, as have been previously described.

As such, the present invention provides a tubular support beam having a self-draining surface that can be incorporated into hygienically designed food processing equipment to eliminate undesirable horizontal surface, which are prone to harboring standing water and bacteria. Additionally, the self-draining support beam of the present invention has an increased load-carrying capability, thereby requiring fewer vertical support legs to support a horizontal platform or walkway.

In an embodiment of the tubular support beam, the first channel or the second channel may form an interior angle between about 92° and about 125° with either a second lengthwise edge of the first channel side wall or a second lengthwise edge of the second channel side wall.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A tubular support beam for minimizing contamination from pooled water, comprising:
    a first channel comprising:
        a first channel side wall;
        a first channel bottom wall joined to the first channel side wall; and
        a first channel top wall joined to the first channel side wall opposite the first channel bottom wall at a first interior angle greater than ninety degrees (90°) and less than one hundred twenty five degrees (125°);
    a second channel comprising:
        a second channel side wall;
        a second channel bottom wall joined to the second channel side wall; and
        a second channel top wall joined to the second channel side wall opposite the second channel bottom wall at a second interior angle greater than ninety degrees (90°) and less than one hundred twenty five degrees (125°);
    a first weld joint joining the first channel top wall and the second channel top wall and
    a second weld joint formed within a root gap extending longitudinally between the first channel bottom wall and the second channel bottom wall.

2. The tubular support beam of claim 1, wherein the first channel sidewall has a height that is greater than a width of the tubular support beam.

3. The tubular support beam of claim 1, wherein the second channel sidewall has a height that is greater than a width of the tubular support beam.

4. The tubular support beam of claim 1, wherein the first weld joint is a corner-to-corner weld joint.

5. The tubular support beam of claim 1, wherein the second weld joint is a butt weld joint.

6. The tubular support beam of claim 1, wherein the first channel top wall is substantially planar.

7. The tubular support beam of claim 1, wherein the first channel top wall is convex.

8. The tubular support beam of claim 1, wherein the first interior angle is one hundred five degrees (105°).

9. The tubular support beam of claim 1, wherein the second interior angle is one hundred five degrees (105°).

10. A method of manufacturing a tubular support beam for minimizing contamination from pooled water, comprising:
    forming a first channel by joining a first channel side wall to a first channel bottom wall at a substantially ninety degree (90°) angle and joining a first channel top wall to the first channel side wall at a first interior angle greater than ninety degrees (90°) and less than one hundred twenty five degrees (125°);
    forming a second channel by joining a second channel side wall to a second channel bottom wall at a substantially ninety degree (90°) angle and joining a second channel top wall to the second channel side wall at a second interior angle greater than ninety degrees (90°) and less than one hundred twenty five degrees (125°);
    forming a first weld joint joining the first channel top wall and the second channel top wall; and
    forming a second weld joint within a root gap between the first channel bottom wall and the second channel bottom wall.

11. The method of claim 10, further comprising forming the first weld joint as a corner-to-corner weld joint.

12. The method of claim 10, further comprising forming the second weld joint as a butt weld joint.

13. The method of claim 10, further comprising joining the first channel top wall to the first channel side wall with the first interior angle equal to one hundred five degrees (105°).

14. A load-carrying structure comprising:
    at least one tubular support beam comprising:
        a first channel having at least a first channel side wall and a first channel bottom wall, wherein a first lengthwise edge of the first channel side wall is contiguous with and forms a substantially 90° interior angle with a first lengthwise edge of the first channel bottom wall;
        a second channel having at least a second channel side wall and a second channel bottom wall, wherein a first lengthwise edge of the second channel side wall is contiguous with and forms a substantially 90° interior angle with a first lengthwise edge of the second channel bottom wall;
        at least one of the first channel or the second channel comprising a top wall, wherein a first lengthwise edge of the top wall is contiguous with and forms an interior angle greater than 90° with either a second lengthwise edge of the first channel side wall or a second lengthwise edge of the second channel side wall;
        a first weld joint to join the first channel and the second channel at a second lengthwise edge of the top wall of the first channel or the second channel, wherein a second lengthwise edge of the first channel bottom wall is aligned with a second lengthwise edge of the second channel bottom wall and separated by a root gap; and
        a second weld joint formed within the root gap to join the second lengthwise edge of the first channel bottom wall to the second lengthwise edge of the second channel bottom wall, forming a tubular support beam;
    at least one receiving member having notched openings in a first side configured to receive the top wall of the tubular support beam; and
    at least one support leg coupled substantially perpendicular to the first channel bottom wall and the second channel bottom wall of the tubular support beam.

15. The load-carrying structure of claim 14, wherein the tubular support beam further comprises a first channel top wall and a second channel top wall, a first lengthwise edge of the first channel top wall is contiguous with and forms an interior angle greater than ninety degrees (90°) with the second lengthwise edge of the first channel side wall, a first lengthwise edge of the second channel top wall is contiguous with and forms an interior angle greater than 90° with the second lengthwise edge of the second channel side wall, and a second lengthwise edge of the first channel top wall and a second lengthwise edge of the second channel top wall are joined by the first weld joint.

* * * * *